(12) United States Patent
Netecke et al.

(10) Patent No.: US 10,697,254 B2
(45) Date of Patent: Jun. 30, 2020

(54) DRAWWORKS SYSTEM WITH VARIABLE FREQUENCY DRIVE

(71) Applicant: Cameron International Corporation, Houston, TX (US)

(72) Inventors: Michael Netecke, Houston, TX (US); Vallie Hodges, Houston, TX (US)

(73) Assignee: Cameron International Corporation, Houston, TX (US)

(*) Notice: Subject to any disclaimer, the term of this patent is extended or adjusted under 35 U.S.C. 154(b) by 141 days.

(21) Appl. No.: 15/950,140

(22) Filed: Apr. 10, 2018

(65) Prior Publication Data

US 2019/0309584 A1 Oct. 10, 2019

(51) Int. Cl.
| | |
|---|---|
| *E21B 19/00* | (2006.01) |
| *B66D 1/12* | (2006.01) |
| *B66D 1/28* | (2006.01) |
| *B66D 1/14* | (2006.01) |
| *H02K 7/116* | (2006.01) |
| *H02K 9/16* | (2006.01) |
| *H02K 11/33* | (2016.01) |
| *H02K 5/20* | (2006.01) |

(52) U.S. Cl.
CPC ............ *E21B 19/008* (2013.01); *B66D 1/12* (2013.01); *B66D 1/14* (2013.01); *B66D 1/28* (2013.01); *H02K 5/20* (2013.01); *H02K 7/116* (2013.01); *H02K 9/16* (2013.01); *H02K 11/33* (2016.01); *B66D 2700/025* (2013.01)

(58) Field of Classification Search
CPC ........ E21B 19/008; H02K 5/20; H02K 11/33; H02K 9/16; H02K 7/116; B66D 1/14; B66D 1/28; B66D 1/12; B66D 2700/025
See application file for complete search history.

(56) References Cited

U.S. PATENT DOCUMENTS

| | | | |
|---|---|---|---|
| 1,731,879 A | 10/1929 | Thompson | |
| 2,271,428 A | 1/1939 | Harry | |
| 2,345,662 A | 4/1944 | Gordon et al. | |
| 2,367,041 A | 1/1945 | Moore et al. | |
| 2,370,855 A | 3/1945 | Gordon | |
| 2,379,858 A * | 7/1945 | Banzhaf .................. | B66D 1/12 254/342 |
| 3,460,807 A | 8/1969 | Prikhodko et al. | |
| 3,550,787 A | 12/1970 | Hicks | |
| 3,738,614 A | 6/1973 | Peterson | |

(Continued)

OTHER PUBLICATIONS

Office Action for the cross referenced U.S. Appl. No. 15/450,302 dated Sep. 7, 2018.

(Continued)

*Primary Examiner* — Kristyn A Hall
*Assistant Examiner* — Jonathan Malikasim
(74) *Attorney, Agent, or Firm* — Helene Raybaud (57) ABSTRACT

A drawworks system for a mineral extraction system includes a drum mounted on a drum shaft and a motor assembly configured to drive rotation of the drum. The motor assembly includes a motor, a variable frequency drive positioned vertically above the motor relative to a skid, and a cooling assembly configured to cool the motor and the variable frequency drive. The cooling assembly is coupled to a housing of the variable frequency drive and is positioned vertically above a drive shaft of the motor relative to the skid.

20 Claims, 8 Drawing Sheets

(56) References Cited

U.S. PATENT DOCUMENTS

| | | | |
|---|---|---|---|
| 4,434,971 A | 3/1984 | Cordrey | |
| 4,602,525 A | 7/1986 | Moroto et al. | |
| 4,907,473 A | 3/1990 | Fujitani et al. | |
| 6,152,848 A | 11/2000 | Williams et al. | |
| 6,182,945 B1 | 2/2001 | Dyer et al. | |
| 6,354,158 B1 * | 3/2002 | Eidem | B66D 1/46 73/862.56 |
| 6,793,203 B2 | 9/2004 | Heinrichs et al. | |
| 6,840,880 B2 | 1/2005 | Glassner | |
| 7,270,312 B1 | 9/2007 | Phipps | |
| 7,487,954 B2 | 2/2009 | Copp et al. | |
| 7,896,315 B2 | 3/2011 | Faust | |
| 8,820,719 B2 | 9/2014 | Ferrari | |
| 9,637,022 B2 | 5/2017 | Gavling et al. | |
| 10,018,259 B2 | 7/2018 | Arnelof | |
| 2003/0111653 A1 | 6/2003 | Heinrichs et al. | |
| 2010/0127229 A1 | 5/2010 | Kvemeland et al. | |
| 2010/0206831 A1 | 8/2010 | Faust | |
| 2014/0284108 A1 | 9/2014 | Pendleton et al. | |
| 2014/0364264 A1 | 12/2014 | Sten | |
| 2015/0083985 A1 | 3/2015 | Lervik | |
| 2015/0375975 A1 | 12/2015 | Flateland | |
| 2016/0003351 A1 | 1/2016 | Park | |
| 2016/0090279 A1 | 3/2016 | Hausladen et al. | |
| 2016/0289052 A1 | 10/2016 | Sorensen et al. | |
| 2017/0001845 A1 | 1/2017 | Moll | |
| 2017/0305729 A1 | 10/2017 | Lautwein et al. | |
| 2017/0362067 A1 | 12/2017 | Hiekata et al. | |
| 2018/0100554 A1 | 4/2018 | Neteche et al. | |
| 2018/0251353 A1 | 9/2018 | Netecke et al. | |
| 2018/0252299 A1 | 9/2018 | Cave et al. | |

OTHER PUBLICATIONS

Final Office Action for the cross referenced U.S. Appl. No. 15/450,302 dated Jan. 17, 2019.

Intelligent Drilling Solutions, "AC Gear-Driven Drawworks for Land and Offshore Rigs," brochure, retrieved at http://ids-oilfield.com/products/ac-drawworks/ on Dec. 12, 2018.

Namco, Machine & Gear Works Ltd., "AC Gear Driven Drawwowrks," brochure, released on Dec. 3, 2009.

Verco Systems, "Automated Drwworks Systems," brochure, copyright 2002.

Office Action for the cross referenced U.S. Appl. No. 15/450,312 dated Apr. 19, 2019.

* cited by examiner

DRAWWORKS SYSTEM WITH VARIABLE FREQUENCY DRIVE

BACKGROUND

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Natural resources, such as oil and gas, are used as fuel to power vehicles, heat homes, and generate electricity, in addition to various other uses. Once a desired resource is discovered below the surface of the earth, drilling and production systems are often employed to access and extract the resource. These systems may be located onshore or offshore depending on the location of the desired resource. Further, such systems may include a wide variety of components, such as various casings, fluid conduits, tools, and the like, that facilitate extraction of the resource from a well during drilling or extraction operations. In some systems, a drawworks system (e.g., hoisting or lifting system) is provided to raise and/or to lower certain components relative to the well.

BRIEF DESCRIPTION OF THE DRAWINGS

Various features, aspects, and advantages of the present disclosure will become better understood when the following detailed description is read with reference to the accompanying figures in which like characters represent like parts throughout the figures, wherein.

DETAILED DESCRIPTION OF SPECIFIC EMBODIMENTS

One or more specific embodiments of the present disclosure will be described below. These described embodiments are only exemplary of the present disclosure. Additionally, in an effort to provide a concise description of these exemplary embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

The present embodiments are generally directed to drawworks systems and methods (e.g., hoisting or lifting systems and methods) for use within a drilling and production system. Certain embodiments include a drawworks system having one or more motors, one or more variable frequency drives, one or more cooling assemblies, a gearbox, a brake, and a drum (e.g., annular drum) mounted on a drum shaft. The drum is configured to support a cable (e.g., wire) that is coupled to components of a hoisting system from which drilling equipment, such as a drill string, is suspended. Rotation of the drum causes the cable to retract (e.g., wrap or wind about the drum) and/or to extend (e.g., unwrap or unwind from the drum) to raise and/or to lower the drilling equipment relative to a drill floor. For example, rotation of the drum in a first direction may cause the cable to extend to lower the drill string to facilitate drilling a wellbore through subterranean formations. In certain embodiments, the drum shaft may be coupled to an output shaft of the gearbox, and the one or more motors may be coupled to an input shaft of the gearbox to enable the one or more motors to drive rotation of the drum. Furthermore, the one or more variable frequency drives may be provided to vary input frequency and voltage to control speed and torque of the one or more motors. The various components may be arranged to provide a compact drawworks system, while also facilitating cooling of the one or more motors and the one or more variable frequency drives via the one or more cooling assemblies.

Figure 1:
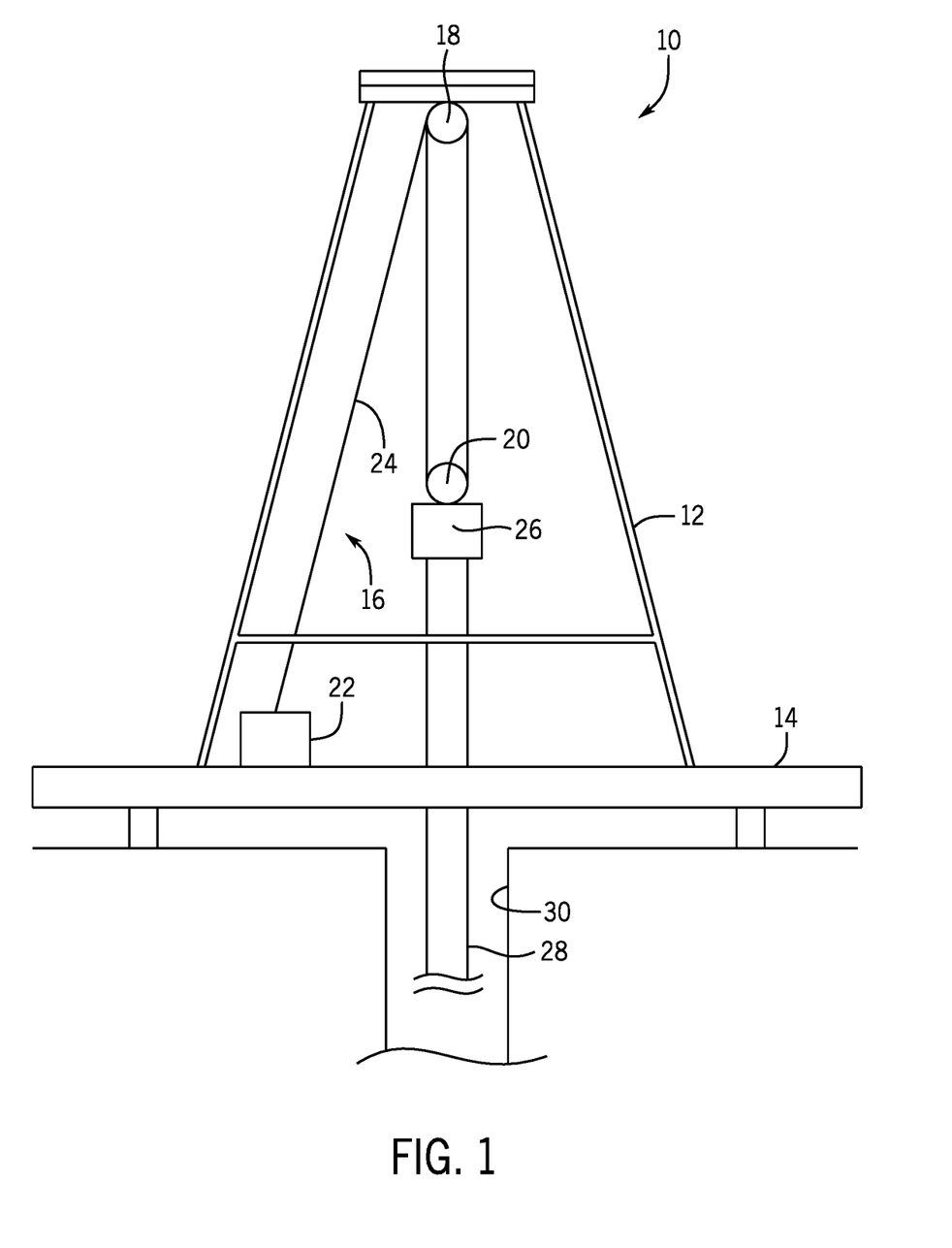
FIG. 1 is a schematic diagram of a portion of a drilling and production system, in accordance with an embodiment of the present disclosure.

With the foregoing in mind, FIG. 1 is a schematic diagram of a portion of a drilling and production system 10, in accordance with an embodiment of the present disclosure. As shown, the system 10 includes a mast 12 positioned on a drill floor 14 and a hoisting system 16 configured to raise and to lower drilling equipment relative to the drill floor 14. In the illustrated embodiment, the hoisting system 16 includes a crown block 18, a traveling block 20, and a drawworks system 22. As shown, a cable 24 (e.g., wire) extends from the drawworks system 22 and couples the crown block 18 to the traveling block 20. In the illustrated embodiment, a top drive 26 is coupled to the traveling block 20, and a drill string 28 is suspended from the top drive 26 and extends through the drill floor 14 into a wellbore 30. The top drive 26 may be configured to rotate the drill string 28, and the hoisting system 16 may be configured to raise and to lower the top drive 26 and the drill string 28 relative to the drill floor 14 to facilitate drilling of the wellbore 30.

Any suitable number of lines of the cable 24 may extend between the crown block 18 and the traveling block 20, and the cable 24 may have any suitable diameter, such as a diameter in a range of 1 to 7 centimeters (cm) or a diameter between approximately 3 to 5, 4 to 4.75, or 4.25 to 4.5 cm. While FIG. 1 illustrates a land-based drilling and production system 10 to facilitate discussion, it should be understood that the disclosed embodiments may be adapted for use within an offshore drilling and production system. Furthermore, it should be understood that the disclosed drawworks system 22 may be utilized in any of a variety of drilling and production systems.

Figure 2:
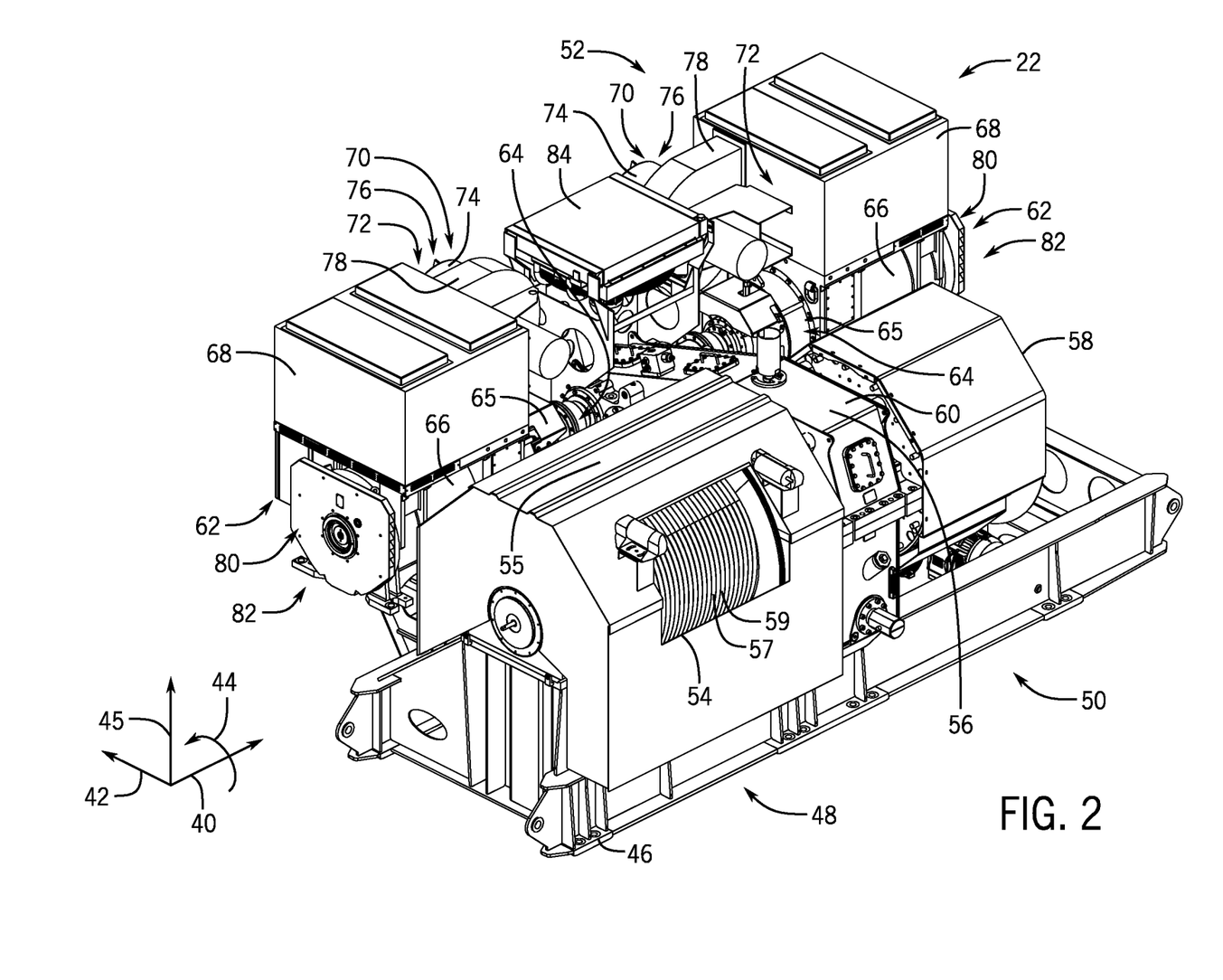
FIG. 2 is a perspective front view of a drawworks system that may be used in the drilling and production system of FIG. 1, in accordance with an embodiment of the present disclosure.

FIG. 2 is a perspective front view of the drawworks system 22 that may be used in the drilling and production system 10 of FIG. 1. To facilitate discussion, the drawworks system 22 and its components may be described with reference to an axial axis or direction 40, a lateral axis or direction 42 (or a radial axis or direction), a circumferential axis or direction 44, and a vertical axis or direction 45. As shown, the drawworks system 22 includes a skid 46 (e.g., frame or support structure) that supports a drum assembly 48, a gearbox assembly 50, and a motor assembly 52.

The drum assembly 48 may include a drum 54 (e.g., annular drum) mounted on a drum shaft and positioned within a drum housing 55. An outer surface 57 (e.g., annular surface) of the drum 54 includes grooves 59 (e.g., circumferentially-extending grooves or Lebus grooves) that are configured to support a cable (e.g., the cable 24 of FIG. 1) that is wrapped circumferentially about the drum 54. The drum 54 may have a diameter in a range of 90 to 150 centimeters (cm). In some embodiments, the drum 54 may have a diameter of between approximately 110 and 130, 115 and 125, or 118 and 120 cm.

The gearbox assembly 50 may include a gearbox 56 (e.g., dual input, parallel shaft, reduction gearbox, triple reduction, single speed, and/or single helical gearbox) and a brake 58 (e.g., pneumatic multi-disc brake or plate brake) supported within and/or coupled to (e.g., directly coupled via one or more fasteners) a gearbox housing 60 (e.g., frame or support structure supported by, coupled to, and/or in contact with the skid 46). Such a configuration may enable the gearbox housing 60 to transfer reaction torque from the brake 58 and/or output torque from the gearbox 56 to the skid 46, thereby providing a compact structure (e.g., the gearbox assembly 50 having the gearbox 56 and the brake 58 coupled to the gearbox housing 60) that effectively transfers forces to the skid 46. For example, the gearbox housing 60 may surround or cover the gearbox 56 (e.g., the shafts and gears of the gearbox 56), and the brake 58 may directly contact and may be directly coupled to the gearbox housing 60, such as via one or more fasteners. As discussed in more detail below, an output shaft of the gearbox 56 may be directly coupled (e.g., via splines) to the drum shaft to drive rotation of the drum shaft and the drum 54, and the brake 58 may be directly coupled (e.g., via splines) to the drum shaft to block rotation of the drum shaft and the drum 54. It should be appreciated that the brake 58 may not be part of the gearbox assembly 50 and may not be supported within and/or coupled to the gearbox housing 60, but instead may be supported within a separate housing, for example.

In certain embodiments, the brake 58 may be configured to hold a hoisting load of the drawworks system 22. As discussed in more detail below, the brake 58 may be a fail-safe brake (e.g., spring applied and air released) that is biased toward a braked position and may be held in a non-braked position via an air supply. In certain embodiments, the brake 58 may be utilized for emergency or parking braking operations (e.g., only for emergency or parking braking operations, non-cyclical braking operations, or holding a suspended load), and the drawworks system 22 is configured to utilize regenerative braking for regular cyclical service braking during hoisting operations.

In certain embodiments, the motor assembly 52 may include one or more electric motors 62 (e.g., alternating current [AC] motors or direct current [DC] motors) supported within respective motor housings 66. The motor assembly 52 may also include respective transmissions 64 (e.g., multi-speed planetary transmissions) supported within respective transmission housings 65. Each transmission 64 may be generally configured to adjust the power output of the respective motor 62. The illustrated embodiment includes two motors 62; however, it should be understood that any suitable number (e.g., 1, 2, 3, 4, or more) of motors 62 and associated components, such as respective transmissions 64 may be provided. As discussed in more detail below, respective drive shafts extending from the one or more motors 62 of the motor assembly 52 may be coupled (e.g., via crowned gear couplings) to an input shaft (e.g., double sided pinion shaft) of the gearbox 56.

In certain embodiments, each of the motors 62 may be configured to operate continuously at least equal to or greater than approximately 1150 horsepower (HP), and each of the motors 62 may be configured to operate intermittently at least equal to or greater than approximately 1500 HP (e.g., during hoisting operations or over a limited period of time, such as less than 10, 20, 30, 60, 90, 120, 180, or 300 minutes). Thus, during hoisting operations, the two motors 62 shown in FIG. 2 may together provide a total of at least equal to or greater than approximately 3000 HP. In some embodiments, each of the motors 62 may be configured to operate continuously between approximately 800-1800, 1000-1500, or 1100-1200 HP and/or intermittently between approximately 1200-2000, 1400-1800, or 1500-1600 HP. Each of the respective transmissions 64 may be a two (a more) speed transmission (e.g., having a gear with a 1:1 gear ratio, a gear with a 2:1 gear ratio, and a neutral gear), and the respective transmissions 64 may enable the drawworks system 22 to hoist the load at a reduced speed using less than all of the motors 62 (e.g., upon failure of one of the two motors 62 shown in FIG. 2). For example, during normal operation of the drawworks system 22, each the respective transmissions 64 may be set to a 1:1 gear ratio and both of the motors 62 may drive rotation of the drum 54 via the gearbox 56 to move a load at a first speed. However, upon certain circumstances (e.g., if a first motor 62 fails), the respective transmission 64 coupled to the first motor 62 may be shifted to the neutral gear, and the respective transmission 64 coupled to a second motor 62 (e.g., intact motor) may be shifted to a 2:1 gear ratio to enable the drawworks system 22 to lift the load at approximately half of the first speed using only the second motor 62. The neutral gear may also enable the other motor (e.g., the second motor 62) to operate with a 1:1 gear ratio with reduced inertia (e.g., system inertia), thereby providing faster acceleration and/or deceleration in low load circumstances, for example. It should be appreciated that the drawworks system 22 may be devoid of the transmissions 64 and/or that the transmissions 64 may have a different configuration or operational characteristics.

The motor assembly 52 may also include one or more variable frequency drives 68 and one or more cooling assemblies 70. For example, as shown, the motor assembly 52 includes a respective variable frequency drive 68 and a respective cooling assembly 70 for each of one or more motors 62. The variable frequency drives 68 may vary input frequency and voltage to control speed and torque of the motors 62, while the cooling assemblies 70 operate to cool the variable frequency drives 68 and the motors 62. In the illustrated embodiment, each variable frequency drive 68 is positioned vertically above the respective motor 62 relative to the skid 46, and each cooling assembly 70 is positioned on an interior side 72 (e.g., axially-facing side) of the respective variable frequency drive 68. Thus, in certain embodiments having two motors 62, the cooling assemblies 70 are positioned between the variable frequency drives 68 along the axial axis 40. Each of the cooling assemblies 70 may include a cover 74 positioned over an air inlet 76, and a fan 78 (e.g., the fan is positioned within the illustrated housing) that draws air from the environment surrounding the drawworks system 22 through the air inlet 76 and into the respective variable frequency drive 68.

Furthermore, each of the one or more motors 62 may include one or more exhaust outlets 80 through which air (e.g., hot air) is exhausted from the motor housing 66. In the illustrated embodiment, the one or more exhaust outlets 80 are positioned on an exterior side 82 (e.g., axially-facing side) of the respective motor 62. Thus, the air is exhausted from the motor housing 66 toward the exterior side 82 and generally away from the air inlets 76 of the cooling assemblies 70. Such a configuration may facilitate cooling because the cooling assemblies 70 are able to draw relatively cooler air into the variable frequency drives 68 and the motors 62, rather than the relatively warmer air that was recently exhausted from the motor housings 66.

As shown, a gearbox cooling assembly 84 (e.g., heat exchanger) may be positioned vertically above the gearbox 56 and/or between the cooling assemblies 70 along the axial axis 40. Such a configuration may facilitate cooling as the gearbox cooling assembly 84 draws relatively cooler air into the gearbox 56, rather than the relatively warmer air that was recently exhausted from the motor housings 66. The illustrated configuration positions the various cooling assemblies 70, 84 proximate to one another between the variable frequency drives 68 and the motors 62 along the axial axis 40, and also positions the various cooling assemblies 70, 84 remotely from the exhaust outlets 80 (e.g., the variable frequency drives 68 and the motors 62 are positioned between the various cooling assemblies 70, 84 and the exhaust outlets 80, thereby blocking intake of air recently exhausted from the motors 62).

Figure 3:
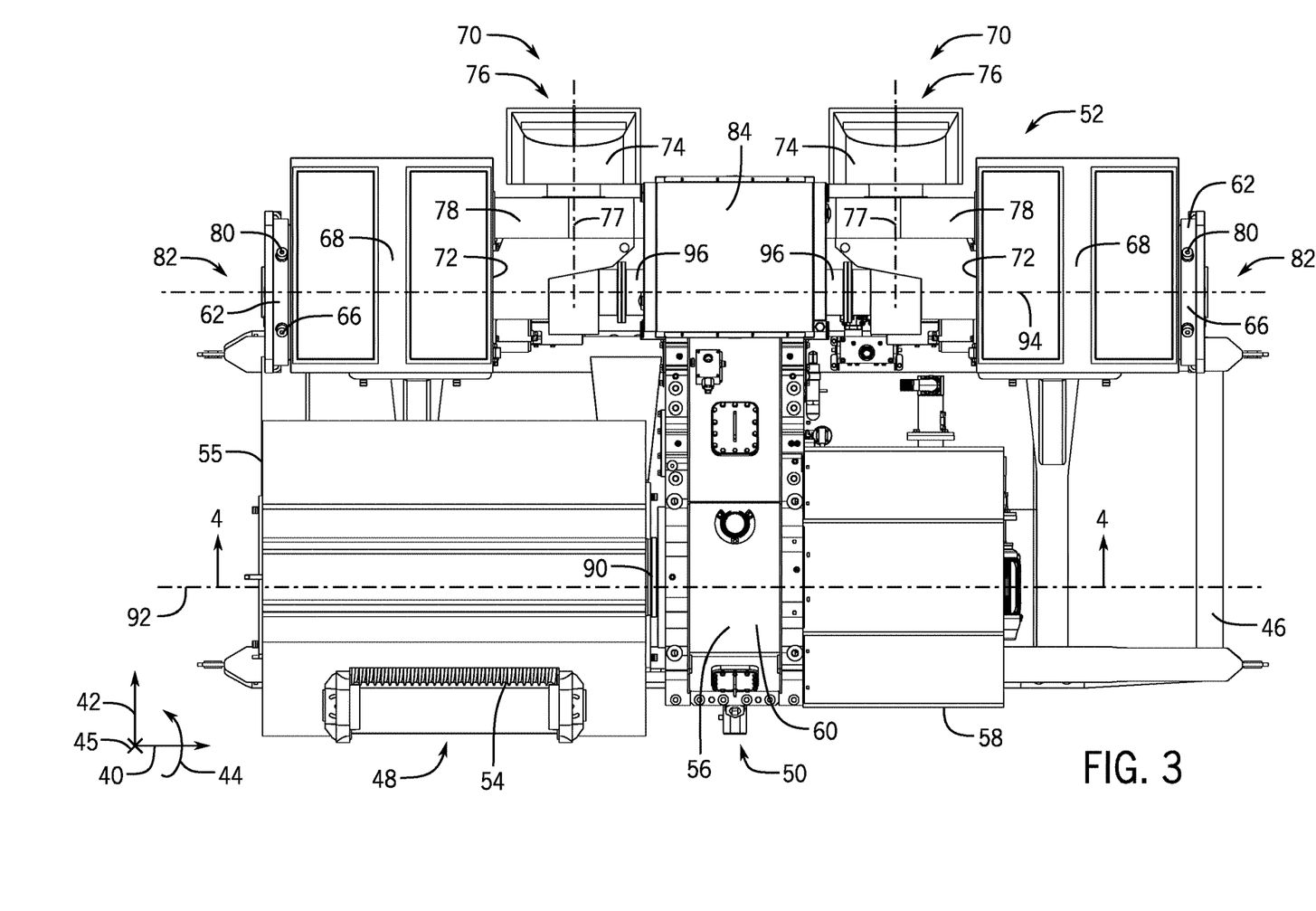
FIG. 3 is a top view of the drawworks system of FIG. 2, in accordance with an embodiment of the present disclosure.

FIG. 3 is a top view of the drawworks system 22. As shown, the drum assembly 48 includes the drum 54 positioned within the drum housing 55, and the drum 54 is mounted on a drum shaft 90 (e.g., non-rotatably mounted so as to rotate with the drum shaft 90) that extends in the axial direction 40 between the drum 54 and the gearbox 56 of the gearbox assembly 50. In the illustrated embodiment, the gearbox 56 and the brake 58 are positioned on one side (e.g., the same side) of the drum 54 along the axial axis 40.

In the illustrated embodiment, the motor assembly 52 includes two motors 62 coupled to respective transmissions 64 (FIG. 2) and respective variable frequency drives 68. The motor assembly 52 may be positioned at a different location along the lateral axis 42 than the drum 54, the drum shaft 90, and/or the brake 58 (e.g., the motor assembly 52 may be separated from the drum 54, the drum shaft 90, and/or the brake 58 along the lateral axis 42). For example, in the illustrated embodiment, both motor assemblies 52 and the components therein are positioned rearward (e.g., along the lateral axis 42) of each of the drum 54, the drum shaft 90, and the brake 58. In the illustrated embodiment, one motor 62 is positioned on one side of the gearbox 56 and another motor 62 is positioned on another side (e.g., an opposite side) of the gearbox 56 along the axial axis 40.

In some embodiments, a rotational axis 92 of the drum 54 and the drum shaft 90 and a rotational axis 94 of drive shafts 96 (e.g., output shafts) of the motor assembly 52 may be generally parallel to one another and separated from one another along the lateral axis 42. In certain embodiments, the rotational axis 92 of the drum 54 and the drum shaft 90 is also the rotational axis of an output shaft of the gearbox 56 and/or the brake 58. In the illustrated embodiment, the gearbox 56 extends along the lateral axis 42 to couple the motor assembly 52 to the drum assembly 48. In particular and as discussed in more detail below, an input shaft of the gearbox 56 is positioned at a first location along the lateral axis 42 and is coupled to the drive shafts 96 of the motor assembly 52, and the output shaft of the gearbox 56 is positioned at a second location along the lateral axis 42 and is coupled to the drum shaft 90. In certain embodiments, the input shaft of the gearbox 56 is parallel to the output shaft of the gearbox 56 (e.g., a parallel shaft gearbox 56).

As shown, each cooling assembly 70 is positioned on the interior side 72 of the respective variable frequency drive 68. Thus, the cooling assemblies 70 are positioned between the variable frequency drives 68 along the axial axis 40. Each of the cooling assemblies 70 may include the cover 74 over the air inlet 76 through which the fan 78 draws air from the environment surrounding the drawworks system 22. In the illustrated embodiment, the fan 78 is oriented to rotate about a rotational axis 77 that is generally perpendicular to the rotational axis 94. Furthermore, the air inlet 76 faces, and the cover 74 extends, rearward from the fan 78 along the lateral axis 42 relative to the drum 54, for example.

As discussed above, the one or more exhaust outlets 80 are positioned on the exterior side 82 of the respective motor 62, and the gearbox cooling assembly 84 is positioned between the cooling assemblies 70 along the axial axis 40. As noted above, such a configuration may facilitate cooling as the cooling assemblies 70 are able to draw relatively cooler air into the variable frequency drives 68 and the motors 62, and the gearbox cooling assembly 84 is able to draw relatively cooler air into the gearbox 56, rather than the relatively warmer air that was recently exhausted from the motor housings 66.

Figure 4:
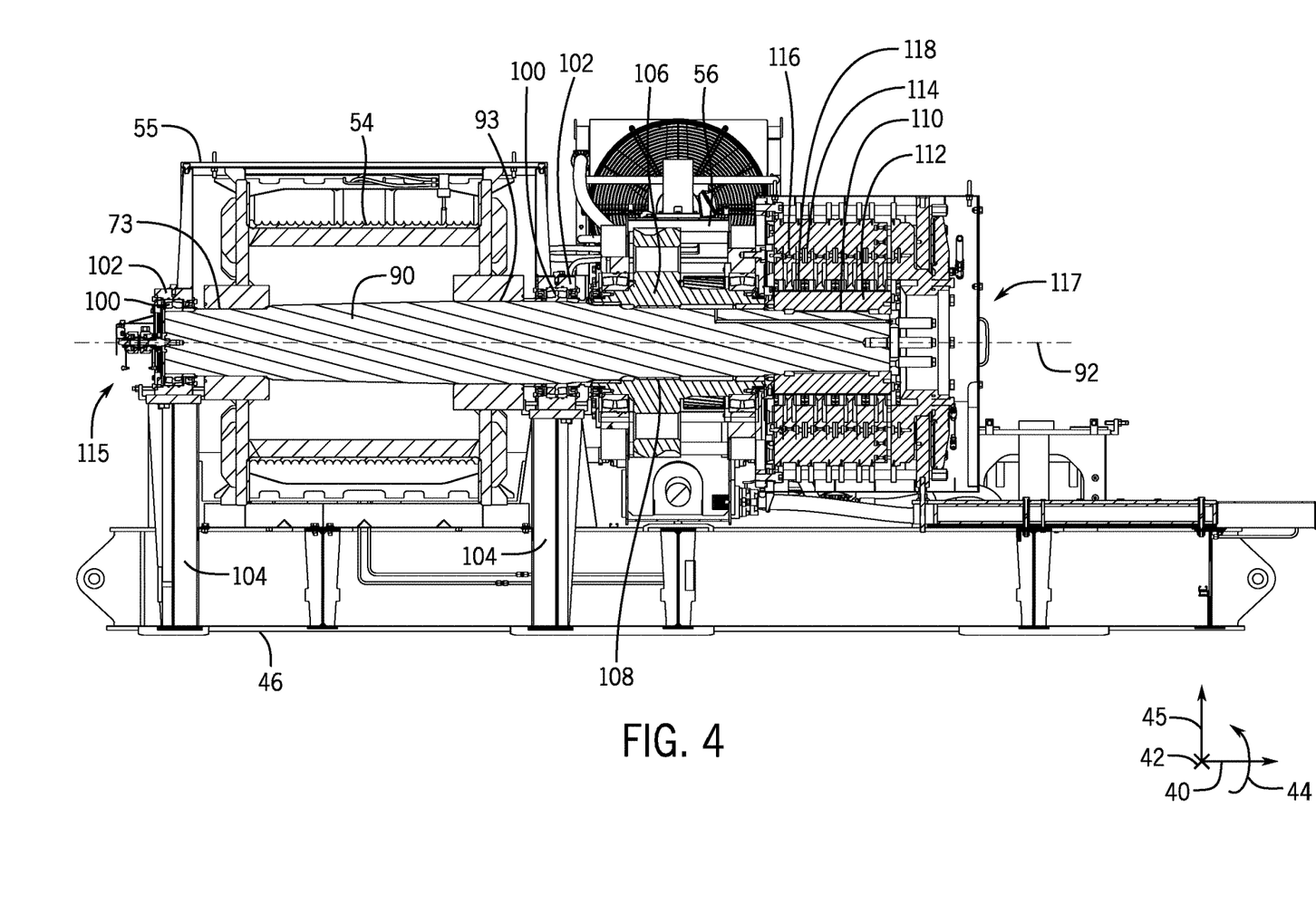
FIG. 4 is a cross-sectional front view of the drawworks system of FIG. 2, in accordance with an embodiment of the present disclosure.

FIG. 4 is a cross-sectional side view of the drawworks system 22, taken through the drum shaft 90 and within lines 4-4 shown in FIG. 3. The motor assembly 52 has been removed for clarity. As shown, the drum 54 is mounted (e.g., non-rotatably mounted via a splined interface 93, such as one or more male and female splines or mating teeth or grooves, so as to rotate with the drum shaft 90) to the drum shaft 90, which is rotatably supported above the skid 46 by bearings 100 within bearing housings 102. For example, in the illustrated embodiment, the bearing housings 102 are coupled to respective brackets 104 (e.g., frames) that are coupled to the skid 46.

In the illustrated embodiment, the drum shaft 90 is coupled to an output shaft 106 (e.g., annular or hollow shaft) of the gearbox 56, such as via a splined interface 108 (e.g., one or more male and female splines or mating teeth or grooves). Thus, rotation of the output shaft 106 drives rotation of the drum shaft 90 and the drum 54. In the illustrated embodiment, the drum shaft 90 is directly coupled to the brake 58, such as via a splined interface 110 between the drum shaft 90 and a hub 112 (e.g., annular or hollow shaft) of the brake 58. Thus, blocking rotation of the hub 112 of the brake 58 blocks rotation of the drum shaft 90 and the drum 54. As shown, the gearbox 56, the output shaft 106, and the brake 58 are positioned on one side (e.g., the same side) of the drum 54 along the axial axis 40, and the drum shaft 90 extends through the output shaft 106 of the gearbox 56 and into the hub 112 of the brake 58. Thus, the drum 54 is positioned on one side of the gearbox 56 and the brake 58 is positioned on another side (e.g., opposite side) of the gearbox 56 along the axial axis 40 (e.g., the gearbox 56 is positioned between the drum 54 and the brake 58 along the axial axis 40). As shown, the drum shaft 90, the output shaft 106, and the hub 112 of the brake 58 are aligned with one another and are configured to rotate about the rotational axis 92 (e.g., coaxial). In the illustrated embodiment, a first end 115 of the drum shaft 90 is supported by the respective bracket 104, and a second end 117 of the drum shaft 90 is positioned within the hub 112 of the brake 58. However, in some embodiments, the second end 117 of the drum shaft 90 may extend through the brake 58 and may be positioned on a side of the brake 58 opposite the gearbox 56 and the drum 54. It should be appreciated that the gearbox 56 may have any suitable configuration to drive the drum shaft 90, and the brake 58 may have any suitable configured to block rotation of the drum shaft 90. Furthermore, it should be appreciated that the brake 58 may be positioned on an opposite side of the drum 54 (e.g., the brake 58 is coupled to the first end 117 of the drum shaft 90, and the drum 54 is positioned between the brake 58 and the gearbox 56 along the axial axis 40).

In some embodiments, the brake 58 may be a fail-safe brake that is biased toward a braked position in which the brake 58 blocks rotation the drum shaft 90 unless an air supply (e.g., via a pneumatic system) is provided to overcome the biasing force to hold the brake 58 in a non-braked position. For example, in certain embodiments, the brake 58 may include brake discs 114, biasing members 116, and radially-extending discs 118 coupled to the hub 112. In operation, the air supply may be provided to the brake 58 to overcome the biasing force of the biasing members 116 to separate the brake discs 114 from the radially-extending discs 118, thereby enabling rotation of the hub 112 and the drum shaft 90. When the air supply is removed, the biasing members 116 may urge the brake discs 114 into contact with the radially-extending discs 118, thereby blocking rotation of the hub 112 and the drum shaft 90. As noted above, the brake 58 may be utilized for emergency or parking braking operations (e.g., non-cyclical braking operations or holding a suspended load), and the drawworks system 22 is configured to utilize regenerative braking for regular cyclical service braking during hoisting operations. Although splined interfaces 93, 108, 110 are shown, these interfaces may have any suitable configuration to couple the components to one another, such as a key-slot interface, bushings, or the like. It should be understood that the brake 58 may be any suitable type of brake, including but not limited to a hydraulically-controlled brake or a plate-type brake (e.g., having a radially-extending disc supported on a hub coupled to the drum shaft 90 and calipers configured to engage the disc to block rotation of the drum shaft 90).

Figure 5:
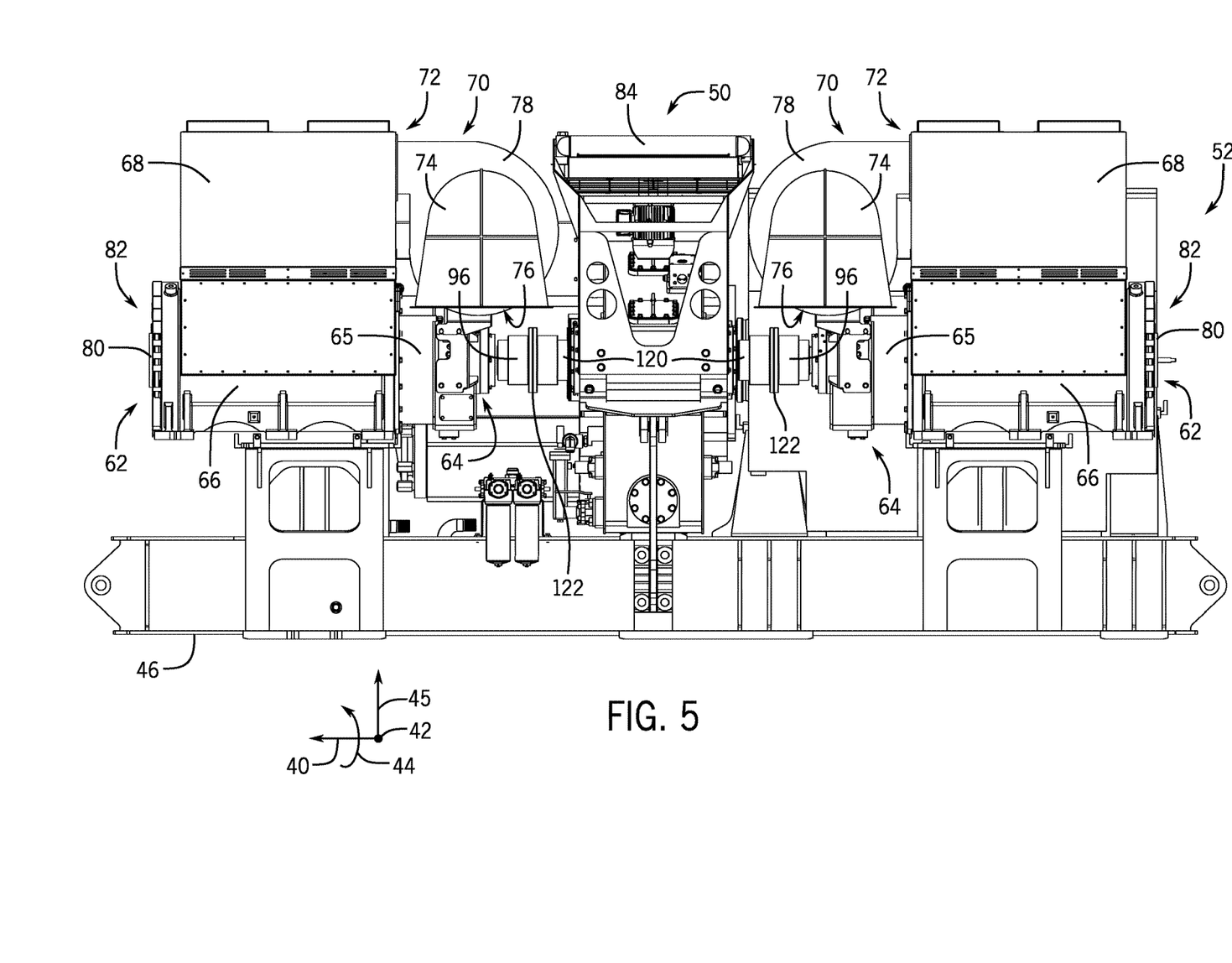
FIG. 5 is a rear view of the drawworks system of FIG. 2, in accordance with an embodiment of the present disclosure.

FIG. 5 is a rear view of the drawworks system 22, in accordance with an embodiment of the present disclosure. As shown, an input shaft 120 (e.g., double-sided pinion input shaft) of the gearbox 56 is coupled to respective drive shafts 96 extending from the motor assemblies 52 via respective gear couplings 122 (e.g., crowned gear couplings). In the illustrated embodiment, the motor assembly 52 includes two motors 62 within respective motor housings 66, and the two transmissions 64 within respective transmission housings 65.

In certain embodiments, the transmissions 64 may be multi-speed transmissions, such as a two-speed transmission configured to operate with a first gear ratio (e.g., 1:1 gear ratio), a second gear ratio (e.g., 2:1 gear ratio), and in neutral. Although examples provided herein relate to a two-speed transmission that provides a 1:1 gear ratio and a 2:1 gear ratio, it should be understood that the drawworks system 22 may include any of a variety of multi-speed transmissions providing any suitable number of gear ratios and/or any suitable gear ratio. In the illustrated embodiment, each transmission 64 is positioned between its respective motor 62 and the input shaft 120 of the gearbox 56 along the axial axis 40. As shown, the input shaft 120 and the drive shafts 96 are aligned with one another and are configured to rotate about the rotational axis 94 (FIG. 3).

The motor assembly 52 also includes the variable frequency drives 68 and the cooling assemblies 70, which each include the cover 74, the air inlet 62, and the fan 78. As shown, each variable frequency drive 68 is positioned vertically above the respective motor 62 relative to the skid 46. Each cooling assembly 70 is positioned vertically above the respective drive shaft 96 relative to the skid 46 and on the interior side 72 of the respective variable frequency drive 68. Thus, the cooling assemblies 70 are positioned between the variable frequency drives 68 along the axial axis 40. As discussed above, the one or more exhaust outlets 80 are positioned on the exterior side 82 of the respective motor 62 (e.g., the motor 62 and the variable frequency drive 68 are positioned between the cooling assembly 70 and the one or more exhaust outlets 80 along the axial axis 40). Furthermore, the gearbox cooling assembly 84 is positioned between the cooling assemblies 70 along the axial axis 40. As noted above, such a configuration may facilitate cooling as the cooling assemblies 70 are able to draw relatively cooler air into the variable frequency drives 68 and the motors 62, and the gearbox cooling assembly 84 is able to draw relatively cooler air into the gearbox 56, rather than the relatively warmer air that was recently exhausted from the motor housings 66.

Figure 6:
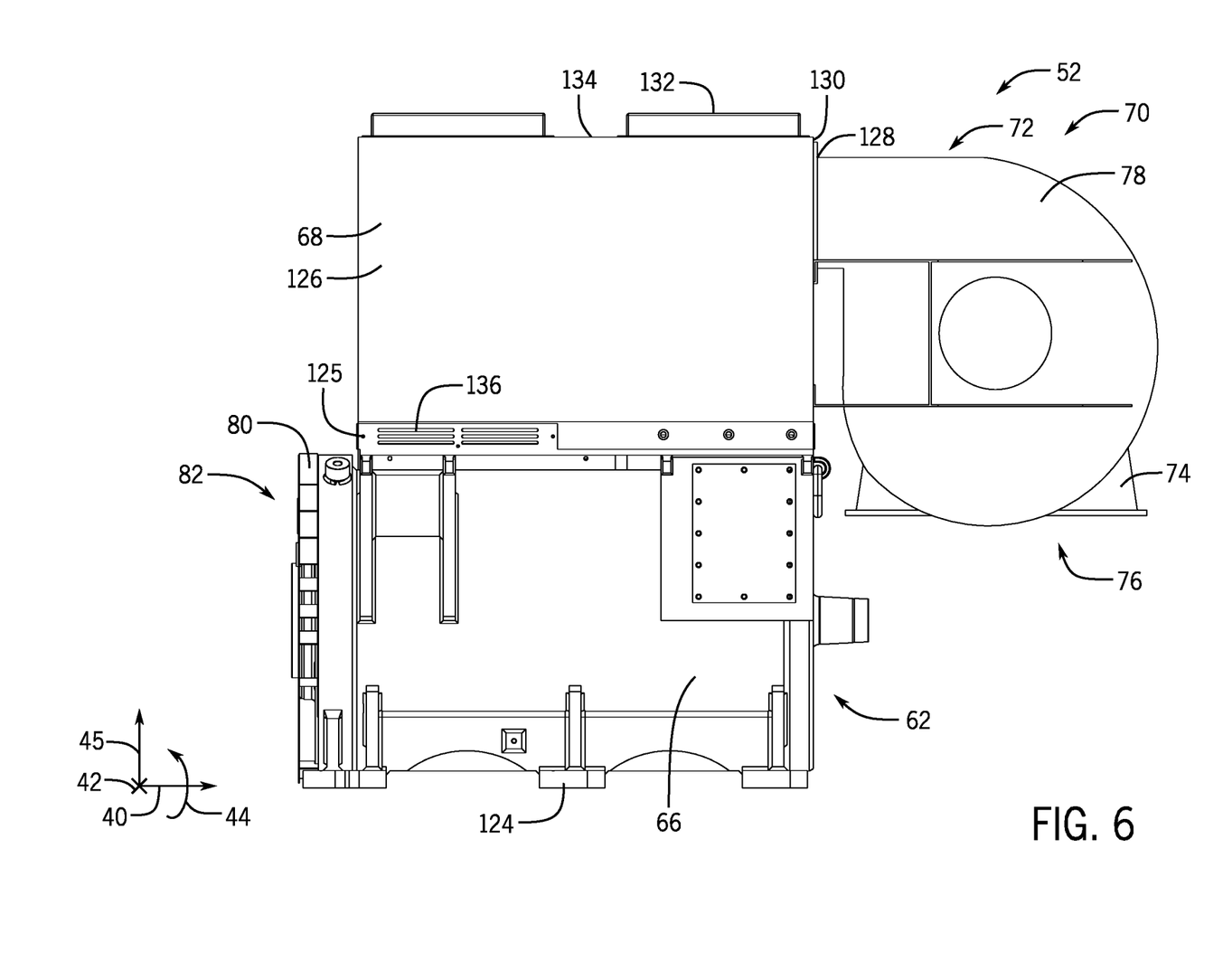
FIG. 6 is a front view of a motor assembly of the drawworks system of FIG. 2, in accordance with an embodiment of the present disclosure.
Figure 7:
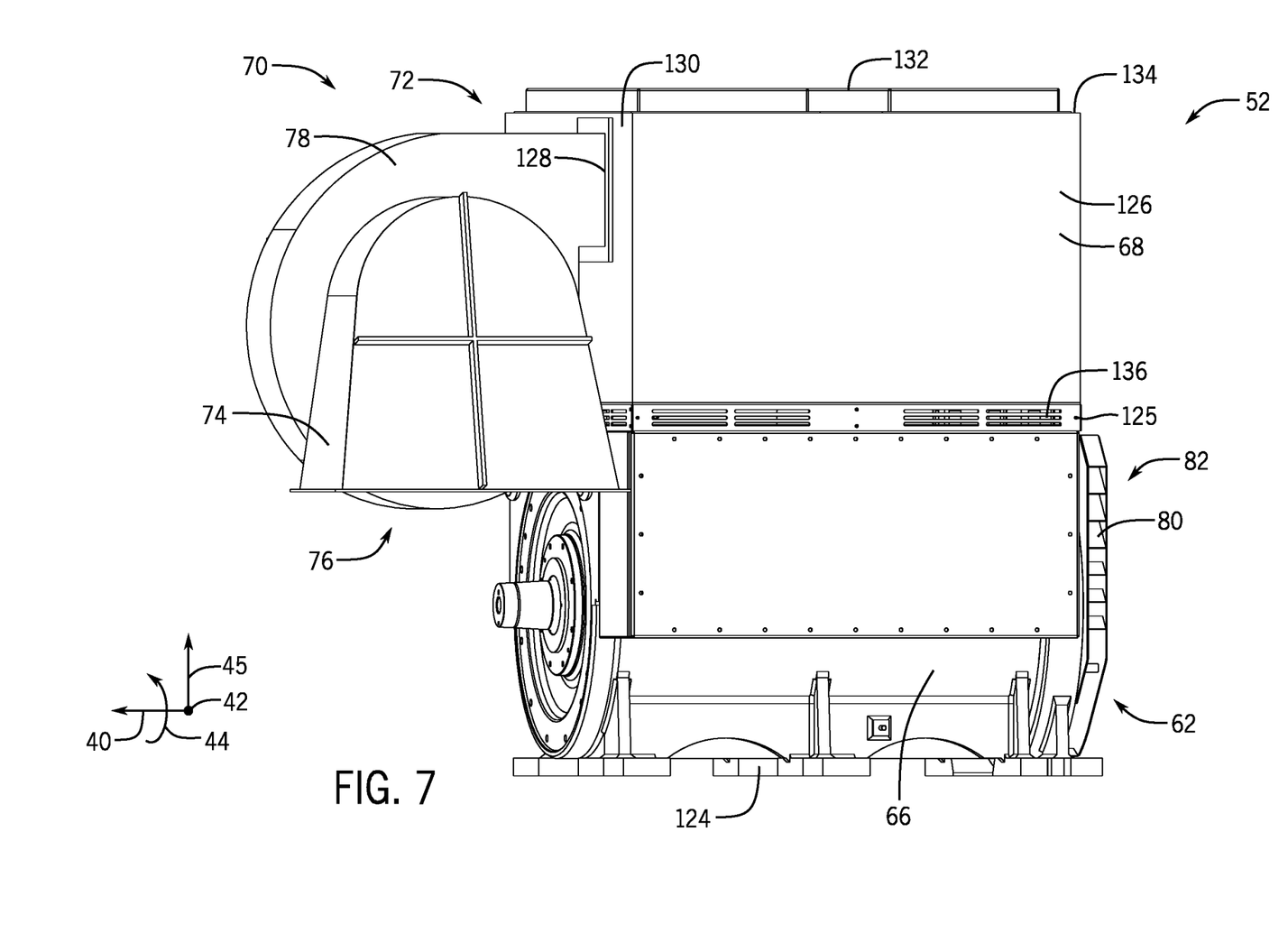
FIG. 7 is a perspective rear view of the motor assembly of FIG. 6, in accordance with an embodiment of the present disclosure.
Figure 8:
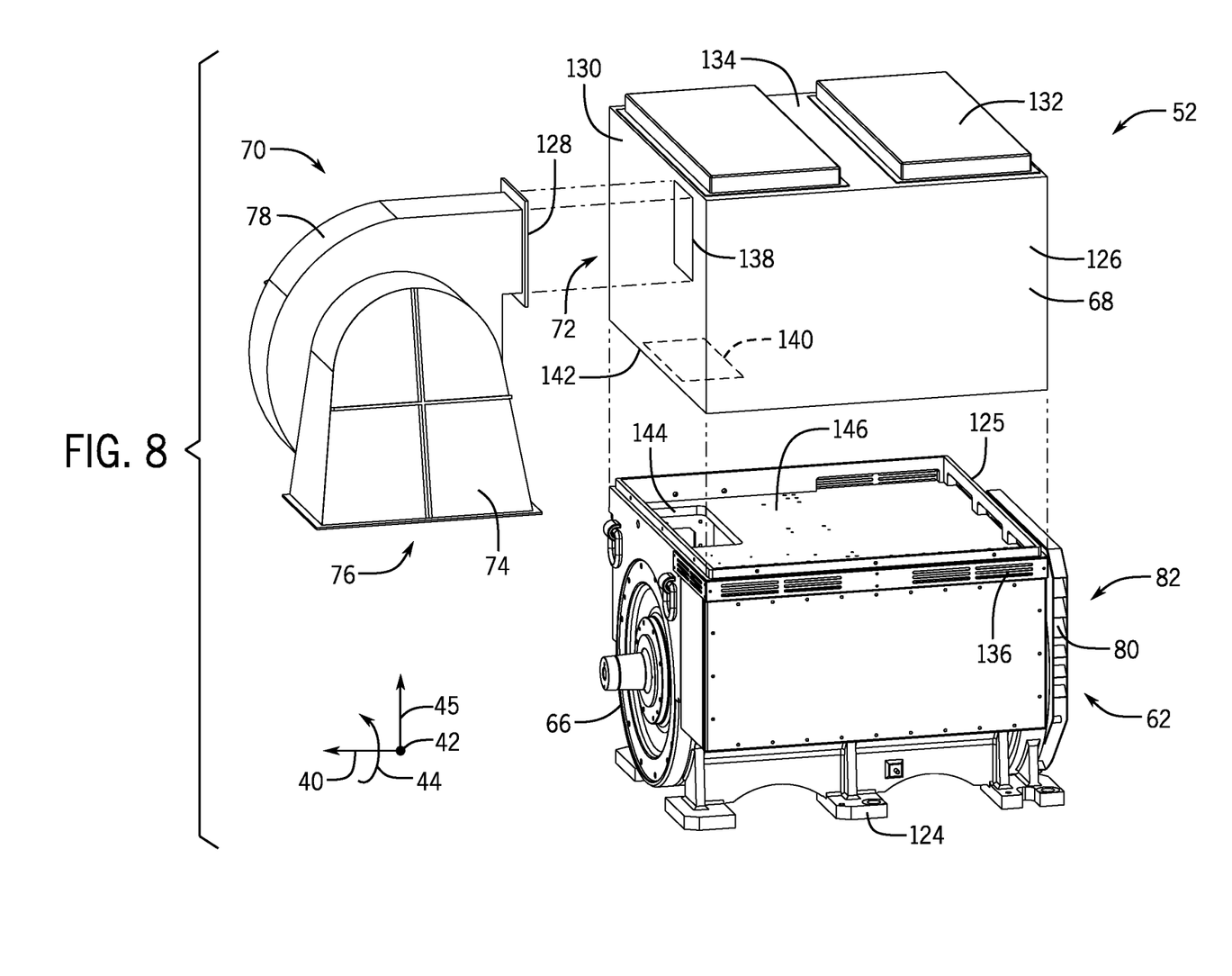
FIG. 8 is a perspective rear view of separated components of the motor assembly of FIG. 6, in accordance with an embodiment of the present disclosure.

FIGS. 6-8 show various views of an embodiment of the motor assembly 52. In particular, FIG. 6 is a front view of the motor assembly 52, FIG. 7 is a perspective rear view of an embodiment of the motor assembly 52, and FIG. 8 is a perspective rear view of various components of the motor assembly 52 separated from one another. As shown, the motor assembly 52 includes the motor 62 within the motor housing 66, the variable frequency drive 68, and the cooling assembly 70, which includes the cover 74, the air inlet 76, and the fan 78. The motor assembly 52 also includes a support structure 124 that is configured to couple to the skid 46 (FIGS. 2-5).

The variable frequency drive 68 is positioned vertically above the motor housing 66. The variable frequency drive 68 includes a housing 126 that houses and/or supports multiple drive modules that operate to vary input frequency and voltage to control speed and torque of the motor 62. The housing 126 is coupled (e.g., via an adapter or support frame 125 and/or one or more fasteners) to the motor housing 66, and the housing 126 has generally the same dimensions as the motor housing 66 along the axial axis 40 and the lateral axis 42 (e.g., length and width of the housings 126, 66 vary by less than 5, 10, 15, or 20 percent), thereby forming a generally compact structure.

The cooling assembly 70 is positioned on the interior side 72 of the variable frequency drive 68. More particularly, an outlet 128 of the cooling assembly 70 is coupled to an interior surface 130 (e.g., axially-facing surface) of the housing 126 of the variable frequency drive 68. Thus, the fan 78 draws air from the environment via the air inlet 76 and directs the air into the housing 126 via the outlet 128. Within the housing 126, the air may enter various chambers to cool the components (e.g., drive modules) of the variable frequency drive 68. Additionally, a portion of the air may flow from the housing 126 into the motor housing 66 to cool the motor 62, and this air is eventually exhausted via the one or more exhaust outlets 80 positioned on the exterior side 82 of the motor housing 66.

In some embodiments, the variable frequency drive 68 may be configured to exhaust air through one or more exhaust outlets 132, which may be positioned at an upper surface 134 (e.g., vertically-facing surface) of the housing 126. However, the one or more exhaust outlets 132 may be positioned at other locations about the housing 126, such as on the exterior side 82 of the housing 126. As shown, additional vents 136 may be provided between the housing 126 and the motor housing 66 to facilitate cooling. The additional vents 126 may be formed in the adapter or support frame 125 that is used to support the variable frequency drive 68 vertically above the motor housing 66, for example.

With reference to FIG. 8, additional features of the motor assembly 52 are illustrated. For example, an inlet 138 is formed in the interior surface 130 of the housing 126 of the variable frequency drive 68 to enable the air to flow from the cooling assembly 70 into the housing 126. Additionally, an outlet 140 is formed in a lower surface 142 (e.g., vertically-facing surface) of the housing 126, and an inlet 144 is formed in the adapter or support frame 125 to enable the air to flow from the housing 126 into the motor housing 66. The illustrated adapter or support frame 125 is configured to mount to the motor housing 66 (e.g., via one or more fasteners) and to receive the housing 126 of the variable frequency drive 68 within a recess 146 (e.g., having a flat vertically-facing surface that supports the variable frequency drive 68) formed by the adapter or support frame 125. However, it should be appreciated that the housing 126 of the variable frequency drive 68 may be coupled to the motor housing 66 via any of a variety of coupling devices or structures having any of a variety of configurations. As illustrated in FIGS. 2-8, the various components of the drawworks system 22 may be arranged to provide a compact drawworks system 22, while also facilitating cooling of the one or more motors 62 and the one or more variable frequency drives 68 via the one or more cooling assemblies 70.

While the disclosure may be susceptible to various modifications and alternative forms, specific embodiments have been shown by way of example in the drawings and have been described in detail herein. However, it should be understood that the disclosure is not intended to be limited to the particular forms disclosed. Rather, the disclosure is to cover all modifications, equivalents, and alternatives falling within the spirit and scope of the disclosure as defined by the following appended claims. It should be appreciated that the motor assembly disclosed herein may be utilized within other types of systems. Furthermore, any of the features and components of FIGS. 1-8 may be utilized together and/or combined in any suitable manner.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A drawworks system for a mineral extraction system, comprising:
a drum mounted on a drum shaft; and
a motor assembly configured to drive rotation of the drum, comprising:
a motor having a motor housing;
a variable frequency drive (VFD) having a VFD housing and positioned vertically above the motor relative to a skid;
a passage extending between the motor housing and the VFD housing; and
a cooling assembly configured to cool the motor and the VFD, wherein the cooling assembly is coupled to the VFD housing and is positioned vertically above a drive shaft of the motor relative to the skid, wherein the cooling assembly is configured to direct an air flow into the VFD housing, and wherein the passage is configured to direct at least a portion of the air flow from the VFD housing into the motor housing.

2. The drawworks system of claim 1, wherein the motor assembly comprises an additional motor, an additional VFD positioned vertically above the additional motor relative to the skid, and an additional cooling assembly configured to cool the additional motor and the additional VFD, and wherein the additional cooling assembly is coupled to a respective VFD housing of the additional VFD and is positioned vertically above a respective drive shaft of the additional motor.

3. The drawworks system of claim 1, wherein the cooling assembly is positioned on an interior side of the VFD housing and the motor assembly comprises one or more exhaust outlets positioned on an exterior side of the motor housing, opposite the interior side of the VFD housing.

4. The drawworks system of claim 1, wherein the cooling assembly comprises a cover positioned over an air inlet of the cooling system.

5. The drawworks system of claim 1, wherein the passage comprises an inlet formed in an interior axially-facing surface of the VFD housing, an outlet formed in a lower vertically-facing surface of the VFD housing, and an additional inlet formed on an upper vertically-facing surface of the motor housing, such that the passage enables at least the portion of the air flow to flow from the cooling assembly, through the VFD housing, and into the motor housing.

6. The drawworks system of claim 1, comprising an adapter mounted to the motor housing, wherein the adapter comprises a recess configured to receive the VFD housing.

7. The drawworks system of claim 1, comprising a gearbox supported within a gearbox housing and comprising a gearbox input shaft and a gearbox output shaft, wherein the gearbox input shaft is coupled to the motor and the gearbox output shaft is coupled to the drum shaft to enable the motor to drive rotation of the drum shaft and the drum.

8. The drawworks system of claim 7, comprising a gearbox cooling assembly positioned proximate to the cooling assembly.

9. The drawworks system of claim 1, wherein the motor assembly is positioned rearward of the drum along a lateral axis of the drawworks system, and a first rotational axis of the drive shaft of the motor is parallel to a second rotational axis of the drum shaft.

10. The drawworks system of claim 1, wherein the cooling assembly is positioned external to the VFD housing.

11. The drawworks system of claim 1, wherein the VFD housing comprises one or more outlets extending through a surface of the VFD housing, wherein the one or more outlets are configured to discharge a remaining portion of the air flow from the VFD housing into a surrounding environment.

12. A drawworks system for a mineral extraction system, comprising:
   a drum mounted on a drum shaft; and
   a motor assembly configured to drive rotation of the drum, comprising:
      a first motor having a first motor housing;
      a second motor having a second motor housing;
      a first variable frequency drive (VFD) having a first VFD housing and positioned vertically above the first motor relative to a skid, wherein a first passage extends between the first motor housing and the first VFD housing;
      a second VFD having a second VFD housing and positioned vertically above the second motor relative to the skid, wherein a second passage extends between the second motor housing and the second VFD housing; and
      a first cooling assembly and a second cooling assembly positioned between the first and second VFDs along an axial axis of the drawworks system, wherein the first cooling assembly is configured to direct a first air flow into the first VFD housing and the second cooling assembly is configured to direct a second air flow into the second VFD housing, and wherein the first passage is configured to direct at least a portion of the first air flow from the first VFD housing into the first motor housing and the second passage is configured to direct at least a portion of the second air flow from the second VFD housing into the second motor housing.

13. The drawworks system of claim 12, wherein the first cooling assembly comprises a first fan fluidly coupled to a first air inlet of the first VFD housing and the second cooling assembly comprises a second fan fluidly coupled to a second air inlet of the second VFD housing, wherein the first air inlet is located on a first interior surface of the first VFD housing with respect to the axial axis of the drawworks system, and the second air inlet is located on a second interior surface of the second VFD housing with respect to the axial axis of the drawworks system.

14. The drawworks system of claim 13, comprising a first exhaust outlet located on a first exterior side of the first motor housing and configured to exhaust at least the portion of the first air flow from the first motor housing and a second exhaust outlet located on a second exterior side of the second motor housing and configured to exhaust at least the portion of the second air flow from the second motor housing, wherein the first air inlet and the second air inlet are positioned axially between the first exhaust outlet and the second exhaust outlet along the axial axis of the drawworks system.

15. The drawworks system of claim 12, wherein the first passage comprises an inlet formed in an interior axially-facing surface of the first VFD housing, an outlet formed in a lower vertically-facing surface of the first VFD housing, and an additional inlet formed on an upper vertically-facing surface of the first motor housing, such that the first passage enables at least the portion of the first air flow to flow from the first cooling assembly, through the first VFD housing, and into the first motor housing.

16. The drawworks system of claim 12, comprising a gearbox supported within a gearbox housing and comprising a gearbox input shaft and a gearbox output shaft, wherein the gearbox input shaft is coupled to the first motor and to the second motor, and the gearbox output shaft is coupled to the drum shaft to enable the first motor and the second motor to drive rotation of the drum shaft and the drum.

17. The drawworks system of claim 16, comprising a gearbox cooling assembly positioned between the first and second VFDs along the axial axis.

18. A motor assembly for a drawworks system, comprising:
   a motor having a motor housing;
   a variable frequency drive (VFD) having a VFD housing and positioned vertically above the motor;
   a passage extending between the motor housing and the VFD housing;
   a cooling assembly configured to cool the motor and the VFD, wherein the cooling assembly is positioned on a first side of the motor along an axial axis of the motor assembly and configured to direct an air flow into the VFD housing, wherein the passage is configured to direct at least a portion of the air flow from the VFD housing into the motor housing; and
   one or more exhaust outlets configured to exhaust at least the portion of the air flow from the motor housing into a surrounding environment, wherein the one or more exhaust outlets are positioned on a second side of the motor, opposite the first side of the motor, along the axial axis.

19. The motor assembly of claim 18, wherein the motor assembly comprises an additional motor, an additional VFD positioned vertically above the additional motor, and an additional cooling assembly configured to cool the additional motor and the additional VFD, and wherein both the cooling assembly and the additional cooling assembly are positioned between the VFD and the additional VFD along the axial axis.

20. The motor assembly of claim 18, wherein the passage comprises an inlet formed in an interior axially-facing surface of the VFD housing, an outlet formed in a lower vertically-facing surface of the VFD housing, and an additional inlet formed in an upper vertically-facing surface of the motor housing, such that the passage enables at least the portion of the air flow to flow from the cooling assembly, through the VFD housing, and into the motor housing.

* * * * *